(12) United States Patent
Ciraula (10) Patent No.: US 11,853,166 B2
(45) Date of Patent: Dec. 26, 2023

(54) STORAGE SYSTEM RECOVERY WITHOUT DATA RETRANSMISSION

(71) Applicant: Dell Products L.P., Hopkinton, MA (US)

(72) Inventor: John Ciraula, Cranberry Township, PA (US)

(73) Assignee: Dell Products L.P., Hopkinton, MA (US)

( * ) Notice: Subject to any disclaimer, the term of this patent is extended or adjusted under 35 U.S.C. 154(b) by 107 days.

(21) Appl. No.: 17/570,439

(22) Filed: Jan. 7, 2022

(65) Prior Publication Data

US 2023/0222035 A1 Jul. 13, 2023

(51) Int. Cl.
*G06F 16/27* (2019.01)
*G06F 11/14* (2006.01)

(52) U.S. Cl.
CPC ................. *G06F 11/1448* (2013.01)

(58) Field of Classification Search
CPC .... G06F 2201/84; G06F 16/128; G06F 16/27; G06F 16/273; G06F 16/275; G06F 11/2023; G06F 11/1448
See application file for complete search history.

(56) References Cited

U.S. PATENT DOCUMENTS

| 2019/0332781 | A1* | 10/2019 | Natanzon | G06F 3/065 |
| 2020/0133502 | A1* | 4/2020 | Yang | G06F 3/0613 |
| 2022/0147541 | A1* | 5/2022 | Mallipeddi | G06F 3/065 |
| 2022/0197761 | A1* | 6/2022 | Pound | G06F 11/0709 |

\* cited by examiner

*Primary Examiner* — Apu M Mofiz
*Assistant Examiner* — Cindy Nguyen
(74) *Attorney, Agent, or Firm* — Anderson Gorecki LLP (57) ABSTRACT

Delta sets that are distributed for asynchronous replication of a storage object are stored at each storage array that maintains a replica of the storage object. In the event of a disaster for which recovery of the storage object is part of the disaster response, locally stored delta sets are used to recover the locally stored replica of the storage object at each storage array. For example, the most recent versions of maliciously altered or lost blocks or tracks may be recovered from the locally stored delta sets.

20 Claims, 5 Drawing Sheets

STORAGE SYSTEM RECOVERY WITHOUT DATA RETRANSMISSION

TECHNICAL FIELD

The subject matter of this disclosure is generally related to recovering the state of a replicated storage object to a previous point in time without retransmitting the recovery data to the storage node at which the storage object replica is being recovered.

BACKGROUND

High-capacity data storage systems such as storage area networks (SANs) and storage arrays are used to maintain storage objects that may be contemporaneously accessed by multiple host servers. SANs and storage arrays include a network of specialized, interconnected compute nodes that manage access to data maintained on arrays of non-volatile drives. The compute nodes respond to input-output (IO) commands from host applications that run on the host servers. Examples of host applications may include, but are not limited to, software for email, accounting, manufacturing, inventory control, and a wide variety of other business processes. A storage object or group of storage objects may be created for each host application.

It is known to coordinate multiple storage arrays to maintain host application data availability and avoid data loss. For example, production storage objects on which host application data is logically stored can be synchronously replicated at different storage arrays so that a primary storage array can quickly failover to a secondary storage array. Production storage objects can be asynchronously replicated at a disaster recovery site for use in the event of a disaster at the primary and secondary sites. Drawbacks associated with disaster recovery from a remote replica include operational complexity and latency associated with retransmission of storage object data back to the storage array where the recovery operation is occurring. Locally stored snapshots provide an alternative for disaster recovery but data that was updated between the most recent snapshot and the disaster event may be unrecoverable. For certain types of businesses with frequently updated storage objects it is desirable to be able to recover a storage object to a point in time that is near, e.g., within a minute of, the occurrence of a disaster. However, generating new snapshots at such frequent intervals can be problematic because IOs to the snapped storage object must be halted during snapshot generation.

SUMMARY

In accordance with some implementations, a method implemented in a storage system with a plurality of storage nodes that each maintain a local replica of a storage object comprises: generating, at a first one of the plurality of storage nodes, deltas that represent differences between temporally distinct versions of a first locally maintained storage object replica at different points in time; storing the deltas at the first one of the plurality of storage nodes; providing the deltas from the first one of the plurality of storage nodes to other ones of the plurality of storage nodes; storing the deltas at the other ones of the plurality of storage nodes; using the locally stored ones of the deltas at one or more of the plurality of storage nodes to update a locally maintained storage object replica; and responsive to a disaster, using selected ones of the locally stored deltas at one or more of the plurality of storage nodes to recover the locally maintained storage object replica.

In accordance with some implementations, an apparatus comprises: a plurality of compute nodes than manage access to an array of non-volatile drives on which data of a replicated storage object is stored, at least one of the compute nodes configured to generate deltas that represent differences between temporally distinct versions of a first locally maintained replica of the storage object at different points in time, store the deltas on the non-volatile drives, provide the deltas to a storage array, and, responsive to a disaster, use selected ones of the deltas stored on the non-volatile drives to recover the first locally maintained replica of the storage object.

In accordance with some implementations, a non-transitory computer-readable storage medium stores instructions that when executed by a storage array compute node perform a method comprising: generating, at a first one of a plurality of storage nodes, deltas that represent differences between temporally distinct versions of a first locally maintained storage object replica at different points in time; storing the deltas at the first one of the plurality of storage nodes; providing the deltas from the first one of the plurality of storage nodes to other ones of the plurality of storage nodes; storing the deltas at the other ones of the plurality of storage nodes; using the locally stored ones of the deltas at one or more of the plurality of storage nodes to update a locally maintained storage object replica; and responsive to a disaster, using selected ones of the locally stored deltas at one or more of the plurality of storage nodes to recover the locally maintained storage object replica.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
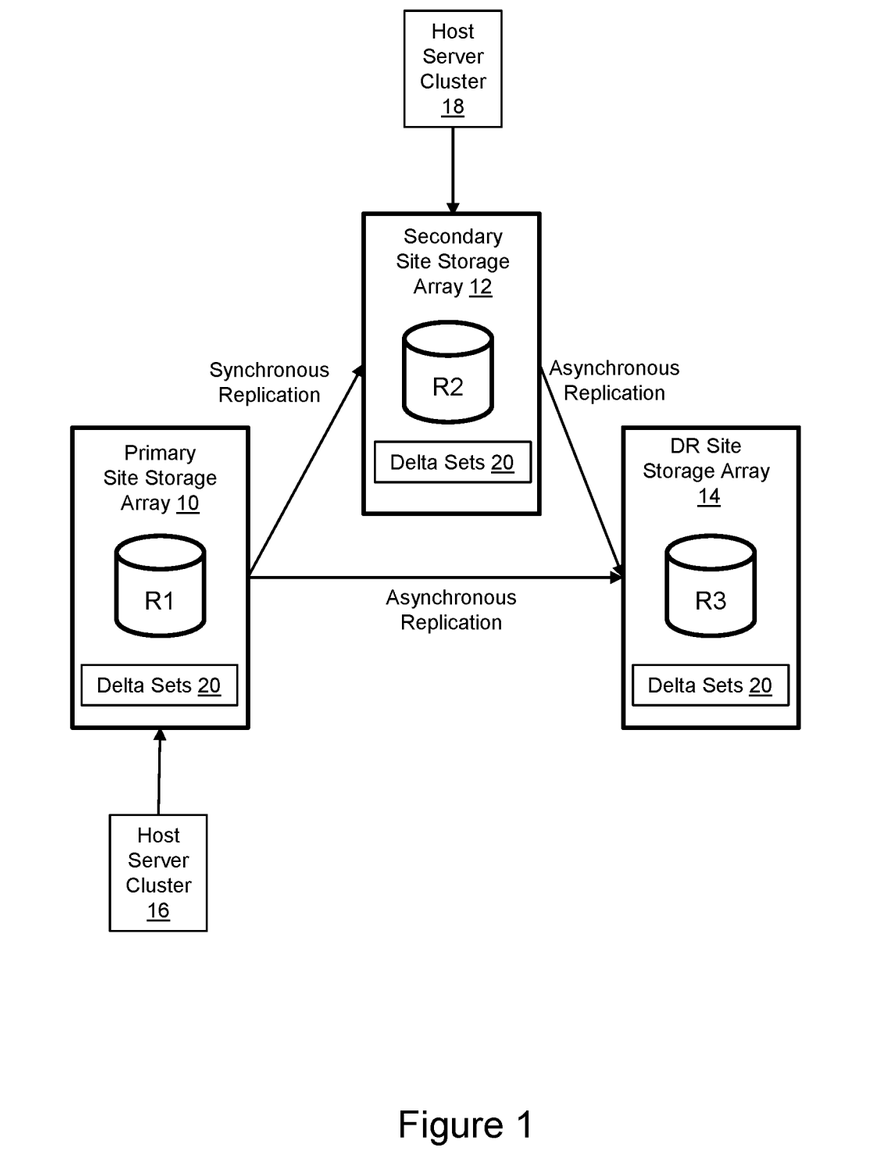
FIG. 1 illustrates distribution and maintenance of delta sets for disaster recovery in a storage system that includes multiple sites and multiple storage arrays with synchronously replicated and asynchronously replicated storage objects.

FIG. 1 illustrates distribution and maintenance of delta sets for disaster recovery in a storage system that includes multiple sites and multiple storage arrays with synchronously replicated and asynchronously replicated storage objects. The illustrated example includes a primary site storage array 10, a secondary site storage array 12, and a disaster recovery site storage array 14. A first replica R1 of a storage object is maintained on the primary site storage array. A second replica R2 of the storage object is maintained on the secondary site storage array. A third replica R3 of the storage object is maintained on the disaster recovery site storage array. The first replica R1 may be a production storage object that is actively accessed by a host server cluster 16 on which host application instances run. The second replica R2 may be a production or failover storage object that is actively accessed or ready to be actively accessed by a host server cluster 18 on which host application instances run. The third replica R3 may be maintained for disaster recovery. Replica R1 and replica R2 are updated synchronously, whereas replica R3 is updated asynchronously. The secondary site storage array could be active or passive while the primary site storage array is active.

Delta sets are generated by the primary site storage array 10 (and possibly the secondary site storage array 12) and sent to the disaster recovery site storage array 14 to asynchronously update the third replica R3. Each delta set represents multiple updates (deltas) resulting from operations such as write IOs to the replicated storage object by the host application instances running in the host server clusters. Each delta may include a storage object ID, a front-end track (FE-TRK) logical block address (LBA), a timestamp, and the host application data associated with the IO. Delta sets may be generated and transmitted at fixed time intervals, e.g., every 5 seconds, 10 seconds, or 15 seconds. Unlike snapshots, delta sets do not require an external action or request to initiate the creation of a snap volume, cessation of IOs to the storage object, or comparison of two storage objects to identify differences. Consequently, delta sets are created and transmitted via normal storage array processing and can be created more frequently than snapshots without overloading the storage array and disrupting host applications. Unlike continuous data protection, delta sets do not necessarily include all changes that occur during the time interval. For example, if a block is updated three times during a 15 second delta set generation interval, then only the last update is included in the delta set.

The disaster recovery site storage array 14 uses the delta sets 20 sent from the other storage arrays to asynchronously update the third replica R3. In the past it has been standard practice to discard the delta sets immediately after use for asynchronous replication. However, it has been discovered that delta sets can be stored and later used to enable recovery of a replica without retransmission of data between storage arrays, e.g., sending a disaster recovery site replica to the primary site storage array to recover the first replica R1. Moreover, the recovery point can be chosen at any time among all delts sets that are stored and thus closer in time than the most recent snapshot that requires an external action or request to be created. This can be advantageous in the event of a disaster such as a ransomware attack that maliciously encrypts some data on the first replica R1 and the second replica R2 before being discovered and halted. The procedure for recovering the maliciously encrypted data from replica R3 can be cumbersome and time-consuming as today the data needs to be retransmitted to all sites and replication to be resynchronized. Moreover, the time difference between the disaster and the most recent snapshot may span hours, which exacerbates the damage caused by the ransomware attack because data that was encrypted after the most recently generated snapshot may be unrecoverable. In accordance with aspects that will be described in greater detail below, at least some of the delta sets 20 generated by the primary site storage array 10 are maintained on the primary site storage array after copies of those delta sets have been sent to the disaster recovery site storage array 14. Further, at least some of the delta sets 20 received by the disaster recovery site storage array 14 are maintained on the disaster recovery site storage array after being used to update the third replica R3. Still further, delta sets 20 generated by the primary site storage array 10 are sent to the secondary site storage array 12, where those delta sets are maintained as local copies. Delta sets may also be generated and distributed by the secondary site storage array 12 if it is configured as active. As will be explained below, the local copies of the delta sets can be used to quickly recover the local replicas of the storage object to a point in time that is nearer to the time of a disaster event than the most recently generated snapshot and allow for the same point in time to be selected at any or all sites without retransmission of the snapshot data between storage arrays.

Figure 2:
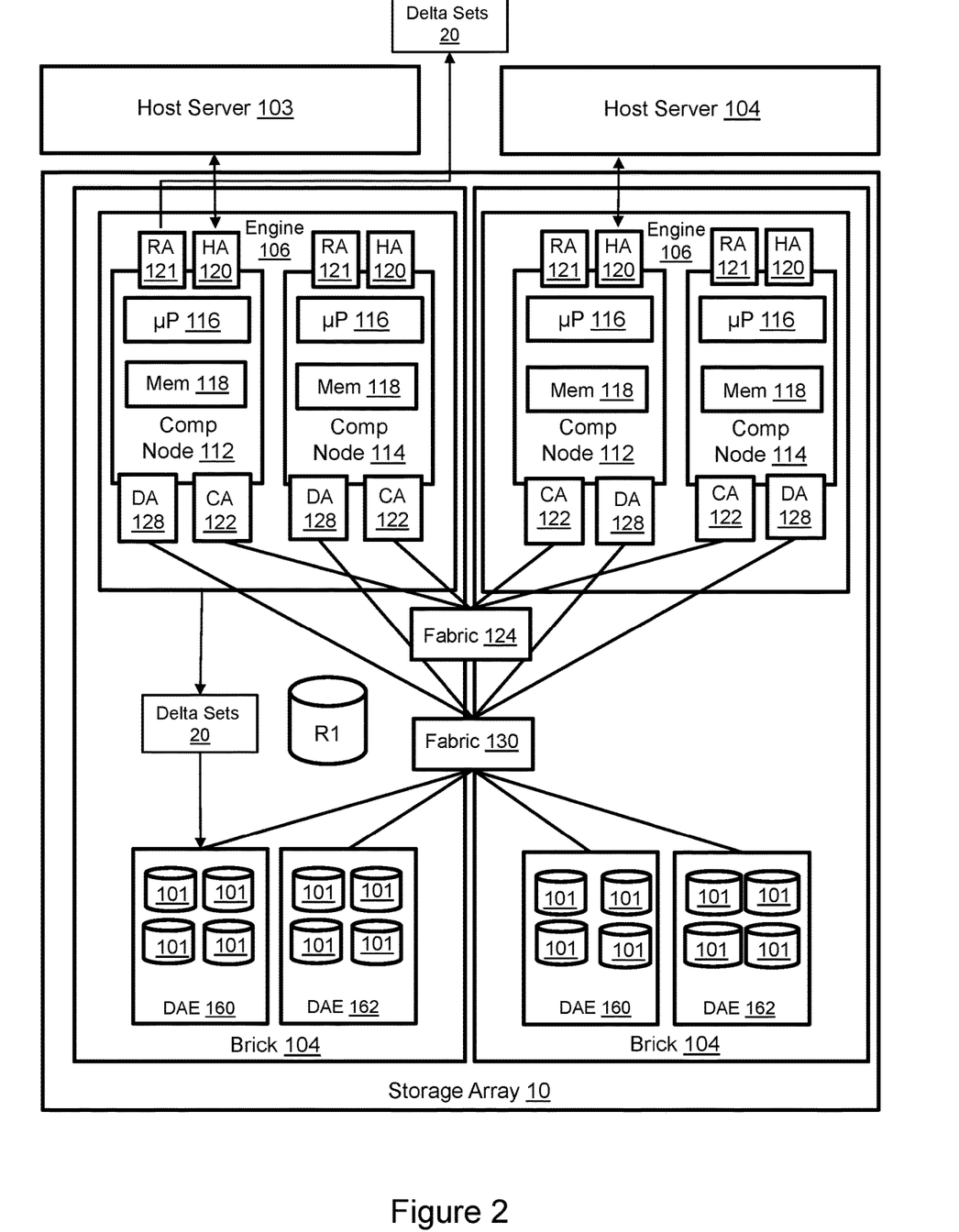
FIG. 2 illustrates a storage array in greater detail.

FIG. 2 illustrates a storage array in greater detail. The primary site storage array 10 is specifically shown, but all the storage arrays may be substantially similar. The storage array is one example of a SAN. The storage array 10 is depicted in a simplified data center environment supporting a cluster of two host servers 103, 104 that run host applications. However, the cluster would typically include more than two host servers. The host servers 103, 104 may include volatile memory, non-volatile storage, and one or more tangible processors that support instances of a host application, as is known in the art. The storage array 10 includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts 103, 104 from the compute nodes 112, 114. Nevertheless, the host applications could run on the compute nodes, e.g., on virtual machines or in containers. Each compute node is implemented as a separate PCB or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers 103, 104. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., the other storage arrays for exchanging delta sets for replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101. Delta sets 20 generated by compute nodes of the storage array are distributed to other storage arrays via the RA 121.

Figure 3:
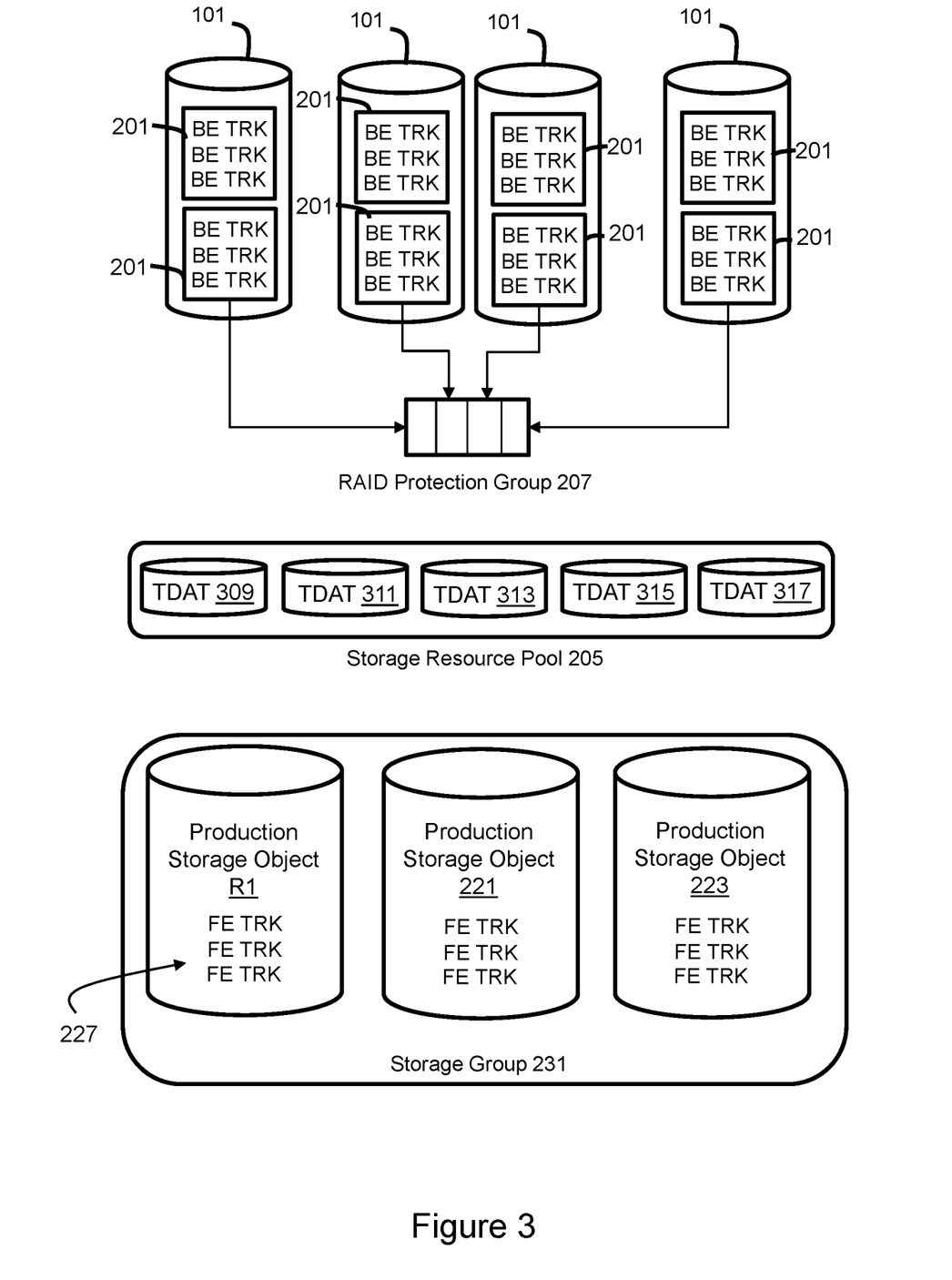
FIG. 3 illustrates layers of abstraction between the managed drives and storage objects of a storage array.

Referring to FIGS. 2 and 3, the host application data and delta sets of the local storage object replica R1 of the replicated storage object are persistently stored on the managed drives 101. The managed drives are not discoverable by the host servers 103, 104 but the storage object replica R1 can be discovered by the host servers. Without limitation, storage objects may be referred to as volumes, devices, or LUNs, where a logical unit number (LUN) is a number used to identify logical storage volumes in accordance with the small computer system interface (SCSI) protocol. Storage objects that can be discovered and accessed by the host servers are identified by the term "production," e.g., a production volume, production device, or production LUN. From the perspective of the host servers 103, 104, each production storage object is a single disk having a set of contiguous logical block addresses (LBAs) on which data used by the instances of a host application resides. However, the host application data is stored at non-contiguous addresses on various managed drives 101. A storage group 231 of multiple production storage objects, including replica R1, storage object 221 (which may also be replicated), and storage object 223 (which may also be replicated), may be created for an individual host application. Multiple instances of a single host application may use data from the same storage group, but instances of different host applications do not use data from the same storage group. The storage array may maintain a large number of production storage objects and storage groups.

The compute nodes 112, 114 maintain metadata that maps between the LBAs of the production storage objects (replica R1, 221, 223) and physical addresses on the managed drives 101 in order to process IOs from the host servers 103, 104. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the production storage objects (replica R1, 221, 223). The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory.

Figure 4:
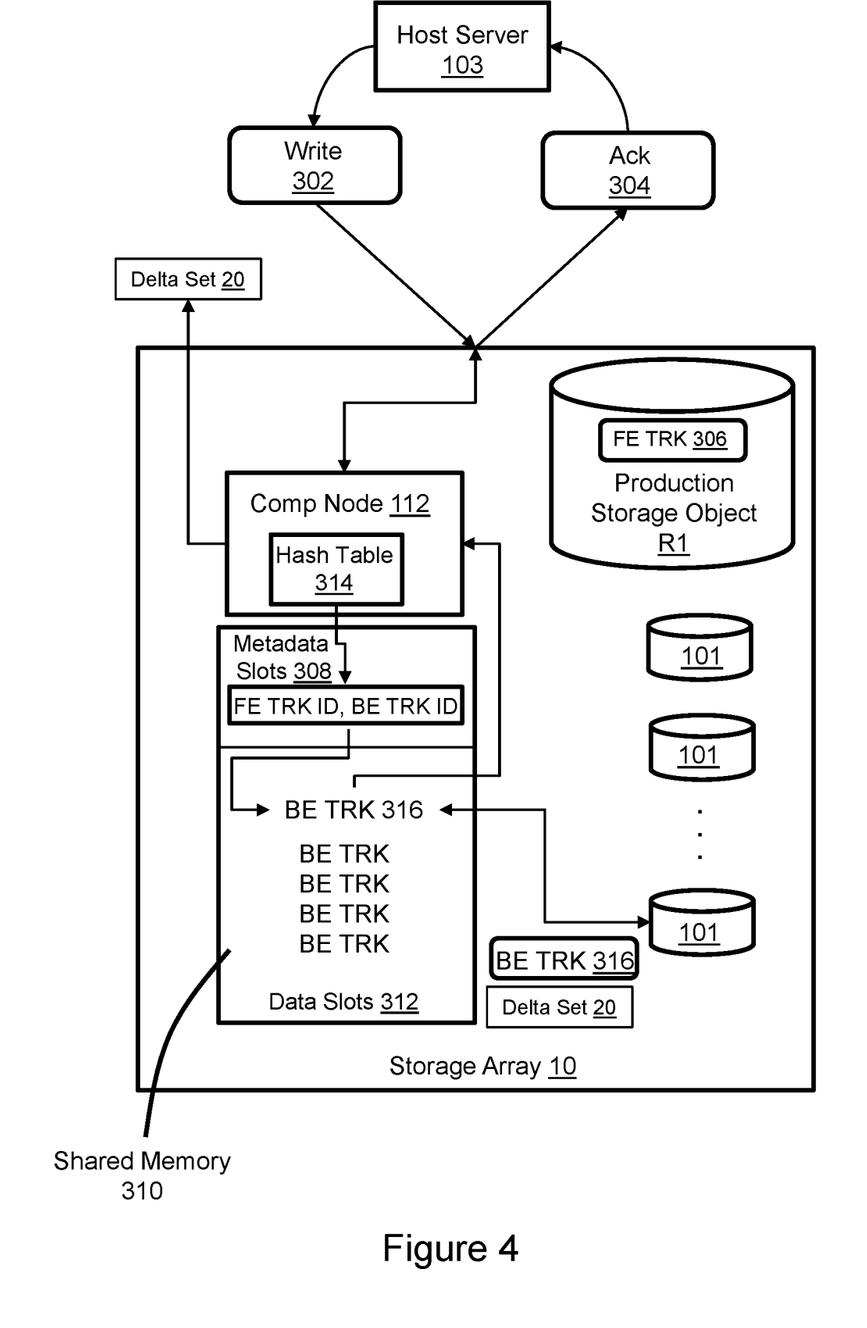
FIG. 4 illustrates delta set generation and use of BE TRK ID pointers and FE TRK ID pointers in shared memory to process IOs.

FIG. 4 illustrates delta set generation and use of BE TRK ID pointers and FE TRK ID pointers in shared memory 310 to process IOs. In the illustrated example, compute node 112 receives a Write IO 302 from host 103 with production replica R1 as the target. Specifically, the IO 302 is a Write to a FE TRK 306 that is logically stored on replica R1. A response 304 to the Write IO 302 is an Ack. Metadata including FE TRK IDs and BE TRK IDs is maintained in metadata slots 308 in an allocated portion of the shared memory 310. The BE TRK IDs are pointers to data slots 312 that contain BE TRKs of host application data. The data slots are located in another allocated portion of the shared memory 310. The compute node 112 identifies a metadata page corresponding to FE TRK 306 by inputting information such as the storage object ID and LBAs obtained from the IO 302 into a hash table 314. The hash table 314 indicates the location of the corresponding metadata page in the metadata slots. The location of the metadata page in shared memory may be local or remote relative to compute node 112. A BE TRK ID pointer from that metadata page is obtained and used by the compute node 112 to find the corresponding data slot that contains BE TRK 316 which is associated with FE TRK 306. The BE TRK 316 is not necessarily present in the data slots when the IO is received because the managed drives 101 have much greater storage capacity than the data slots and IOs are serviced continuously. If the corresponding BE TRK 316 is not present in the data slots, then the compute node 112 can locate and copy the BE TRK 316 from the managed drives 101 into an empty data slot. In the case of a Write, the data from the IO is copied into the BE TRK in the data slots corresponding to the FE TRK designated in the IO, the track is marked as dirty in the metadata, and eventually the data is destaged from the data slots to the managed drives 101, e.g., overwriting the stale copy on the managed drives. A delta set 20 is generated by locating deltas in the shared memory, which may be efficiently accomplished by searching for metadata slots with dirty data bits set. Tracks that are marked as dirty in the metadata slots are found and corresponding deltas are generated that include the storage object ID and FE TRK LBA from the metadata slots and the corresponding data from the data slots. Delta sets are generated at regular time intervals, stored in the managed drives, and distributed to other storage arrays that maintain replicas of the storage object. In general, the dirty tracks are not destaged to the managed drives until the update has been added to a delta set. All metadata may be maintained in the shared memory, thereby facilitating identification of deltas by searching the metadata slots.

Figure 5:
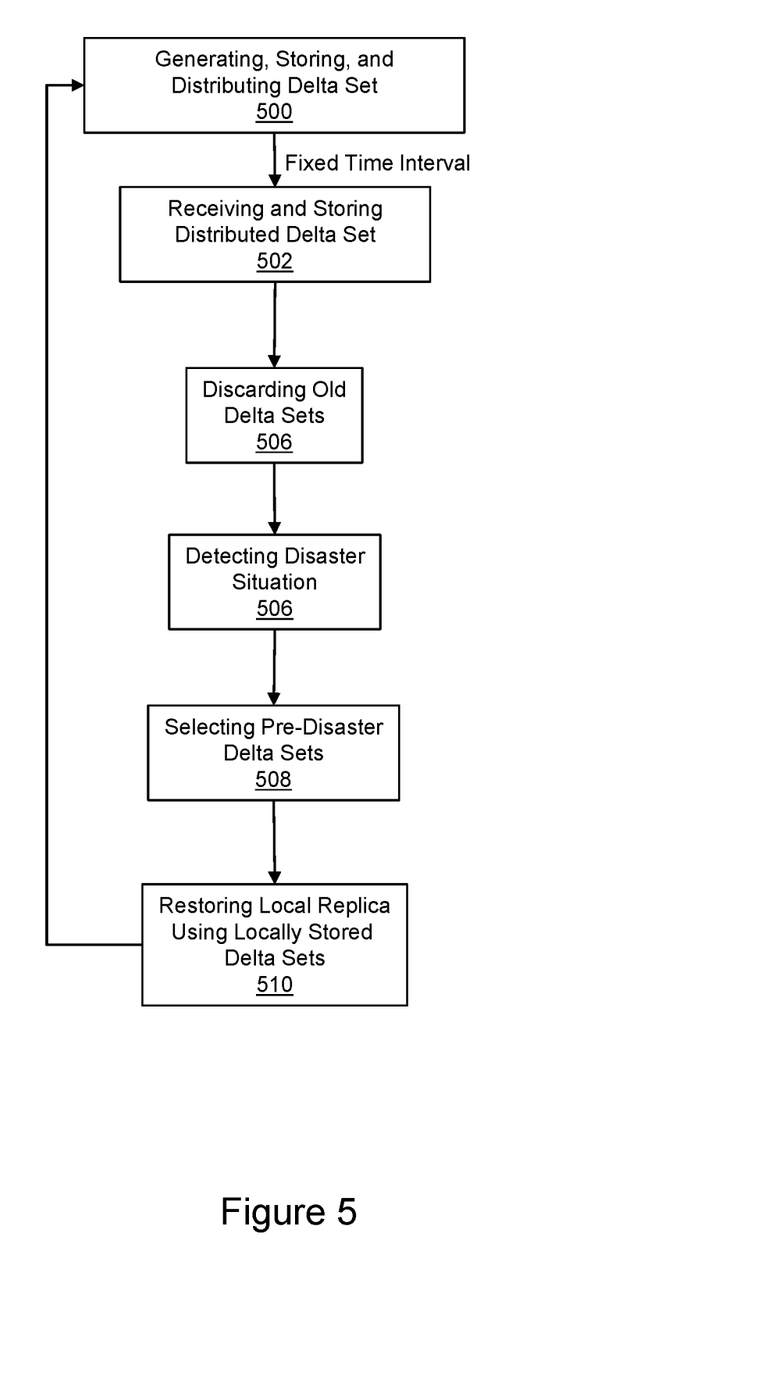
FIG. 5 illustrates a method for using locally stored delta sets for storage system recovery without data retransmission.

FIG. 5 illustrates a method for using locally stored delta sets for storage system recovery without data retransmission. Step 500 is generating, storing, and distributing delta sets of a replicated storage object at fixed time intervals. Step 500 is iterated independently from other steps at each originating storage array, e.g., the primary site storage array if that is the only active storage array or the primary site storage array and the secondary site storage array in an active-active configuration. Step 502 is receiving and storing the distributed delta sets at other storage arrays that maintain replicas of the storage object. At storage arrays that maintain an asynchronously updated replica the distributed delta sets are used to update the locally maintained replica. Synchronously updated replicas are updated via other means that are known in the art. Regardless of whether the delta sets are used for asynchronous update of a replica, the delta sets are stored locally at each receiving storage array. Step 506 is discarding old delta sets. As previously mentioned, locally stored delta sets enable recovery to a point in time that may be closer to the time of the disaster event than any snapshot unless the snapshot was taken at a shorter time interval that delta set creation prior to the disaster event which is highly unlikely. Locally stored delta sets that are no longer needed or practical to store locally may be discarded. For example, the business needs to protect data for up to 48 hours. Delta sets that are older than 48 hours may be discarded. Step 506 is detecting a disaster situation. A wide variety of potential disasters exist, but in general step 506 refers to disaster situations for which recovery of a replicated storage object is part of the disaster response. An example is a ransomware attack that maliciously encrypts some of replicated storage object data before the attack is discovered and malicious encryption halted. Step 508 is selecting locally stored pre-disaster delta sets for the recovery operation. This may be performed at each storage array independently. The locally stored delta sets may be searched in order, beginning with the most recent delta set, to identify the delta sets that contain the maliciously encrypted tracks of the replicated storage object. Step 510 is using the locally stored delta sets identified in step 508 to recover the local replica. This may be performed at each storage array independently. For example, the delta sets may be used to recover the most recent version of each of the maliciously encrypted tracks. In some implementations steps 508 and 510 are first performed at the secondary or disaster recovery site storage array and verified before being performed at the primary site storage array. This may advantageously enable the primary site storage array to continue servicing live IOs while recovery solutions are tested at the other storage arrays.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method implemented in a storage system with a plurality of storage nodes that each maintain a local replica of a storage object, the method comprising:
generating, at a first one of the plurality of storage nodes at fixed intervals of time, deltas that comprise data differences between temporally distinct versions of a first locally maintained storage object replica at different points in time determined by the fixed intervals;
storing the deltas at the first one of the plurality of storage nodes;
providing the deltas from the first one of the plurality of storage nodes to other ones of the plurality of storage nodes;
storing the deltas at the other ones of the plurality of storage nodes independent from associated locally maintained storage object replicas;
using the locally stored ones of the deltas at one or more of the plurality of storage nodes to update the associated locally maintained storage object replicas;
maintaining the locally stored deltas at one or more of the plurality of storage nodes after updating the associated locally maintained storage object replicas; and
responsive to a disaster, using selected ones of the locally stored deltas at one or more of the plurality of storage nodes to recover the locally maintained storage object replica to one of the different points in time determined by the fixed intervals.

2. The method of claim 1 comprising generating the deltas at the fixed time intervals without halting IOs to the storage object.

3. The method of claim 1 comprising generating the deltas at fixed time intervals of from 5 seconds to 15 seconds, inclusive, without halting IOs to the storage object.

4. The method of claim 1 comprising using selected ones of the locally stored deltas at a disaster recovery storage node to recover the locally maintained storage object replica and validating the recovered locally maintained storage object replica prior to using selected ones of the locally stored deltas at a production storage node.

5. The method of claim 1 comprising generating the deltas from dirty data in cache that has not been destaged to non-volatile storage.

6. The method of claim 5 comprising adding a storage object identifier to the deltas.

7. The method of claim 6 comprising adding timestamps to the deltas.

8. The method of claim 7 comprising identifying updated logical block addresses of the storage object in the deltas.

9. An apparatus comprising:
a plurality of compute nodes than manage access to an array of non-volatile drives on which data of a replicated storage object is stored, at least one of the compute nodes configured to generate, at fixed intervals of time, deltas that comprise data differences between temporally distinct versions of a first locally maintained replica of the storage object at different points in time determined by the fixed intervals, store the deltas on the non-volatile drives independent from data of the first locally maintained replica of the storage object, provide the deltas to a storage array, maintain the stored deltas after the first locally maintained replica has been updated, and, responsive to a disaster, use selected ones of the deltas stored on the non-volatile drives to recover the first locally maintained replica of the storage object to one of the different points in time determined by the fixed intervals.

10. The apparatus of claim 9 wherein the compute node is configured to generate the deltas at the fixed time intervals without halting IOs to the storage object.

11. The apparatus of claim 9 wherein the compute node is configured to generate the deltas at fixed time intervals of from 5 seconds to 15 seconds, inclusive, without halting IOs to the storage object.

12. The apparatus of claim 9 wherein the compute node is configured to use selected ones of the locally stored deltas at a disaster recovery storage node to recover the locally maintained storage object replica and validating the recovered locally maintained storage object replica prior to using selected ones of the locally stored deltas at a production storage node.

13. The apparatus of claim 9 wherein the compute node is configured to generate the deltas from dirty data in cache that has not been destaged to non-volatile storage.

14. The apparatus of claim 13 wherein the compute node is configured to add a storage object identifier to the deltas.

15. The apparatus of claim 14 wherein the compute node is configured to add timestamps to the deltas.

16. A non-transitory computer-readable storage medium storing instructions that when executed by a storage array compute node perform a method comprising:
   generating, at a first one of a plurality of storage nodes at fixed intervals of time, deltas that comprise data differences between temporally distinct versions of a first locally maintained storage object replica at different points in time determined by the fixed intervals;
   storing the deltas at the first one of the plurality of storage nodes;
   providing the deltas from the first one of the plurality of storage nodes to other ones of the plurality of storage nodes;
   storing the deltas at the other ones of the plurality of storage nodes independent from associated locally maintained storage object replicas;
   using the locally stored ones of the deltas at one or more of the plurality of storage nodes to update the associated locally maintained storage object replicas;
   maintaining the locally stored deltas at one or more of the plurality of storage nodes after updating the associated locally maintained storage object replicas; and
   responsive to a disaster, using selected ones of the locally stored deltas at one or more of the plurality of storage nodes to recover the locally maintained storage object replica to one of the different points in time determined by the fixed intervals.

17. The non-transitory computer-readable storage medium of claim 16 wherein the method comprises generating the deltas at the fixed time intervals without halting IOs to the storage object.

18. The non-transitory computer-readable storage medium of claim 16 wherein the method comprises using selected ones of the locally stored deltas at a disaster recovery storage node to recover the locally maintained storage object replica and validating the recovered locally maintained storage object replica prior to using selected ones of the locally stored deltas at a production storage node.

19. The non-transitory computer-readable storage medium of claim 16 wherein the method comprises generating the deltas from dirty data in cache that has not been destaged to non-volatile storage.

20. The non-transitory computer-readable storage medium of claim 19 wherein the method comprises adding a storage object identifier to the deltas, adding timestamps to the deltas, and identifying updated logical block addresses of the storage object in the deltas.

* * * * *